(12) United States Patent
Grafenhain

(10) Patent No.: US 6,459,538 B2
(45) Date of Patent: Oct. 1, 2002

(54) EYEPIECE TUBE SLEEVE

(75) Inventor: Paul Grafenhain, Heerbrugg (CH)

(73) Assignee: Leica Microsystems AG, Heerbrugg (CH)

(*) Notice: Subject to any disclaimer, the term of this patent is extended or adjusted under 35 U.S.C. 154(b) by 0 days.

(21) Appl. No.: 09/855,112

(22) Filed: May 14, 2001

(30) Foreign Application Priority Data

May 15, 2000 (DE) .......................... 100 23 569
Sep. 13, 2000 (DE) .......................... 100 45 228

(51) Int. Cl.⁷ .......................... G02B 7/02; G02B 11/04
(52) U.S. Cl. .................. 359/808; 359/510; 359/513
(58) Field of Search ................. 359/808, 811, 359/510, 511, 512, 513

(56) References Cited

U.S. PATENT DOCUMENTS 4,799,779 A * 1/1989 Mesmer ...................... 359/510
5,056,903 A * 10/1991 Nakamura et al. .......... 359/513

* cited by examiner

Primary Examiner—Loha Ben
(74) Attorney, Agent, or Firm—Hodgson Russ LLP

(57) ABSTRACT

The invention describes a sleeve (1) for movably retained eyepiece tubes (2) for optical devices which rests with its eyepiece-side part (5) against the outer wall of the eyepiece tube (2), and with its housing-side part (6) fits around the inner wall of an opening (7) in the tube housing (3) provided for the eyepiece tube (2). The sleeve (1) is characterized an immovable fit on both device assemblies (2 and 3), and is securely protected against even unintentional removal. The result is to achieve a hermetic seal, impermeable to air and moisture, of the relevant parts of the optical device.

18 Claims, 3 Drawing Sheets

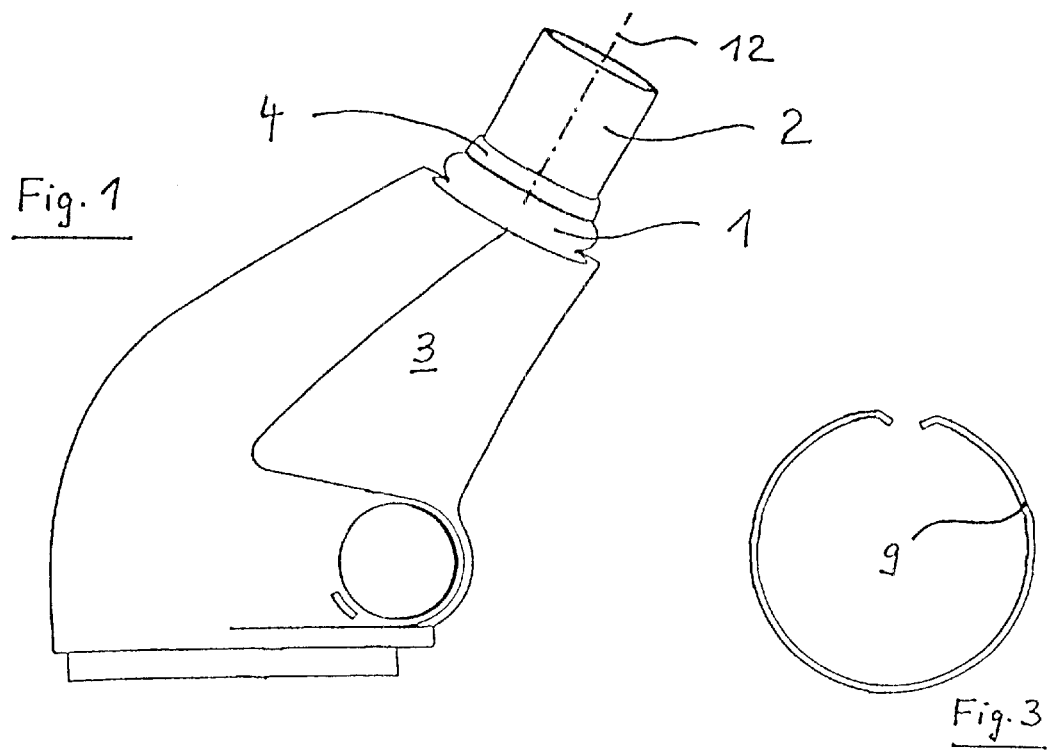
Fig. 1
Fig. 3
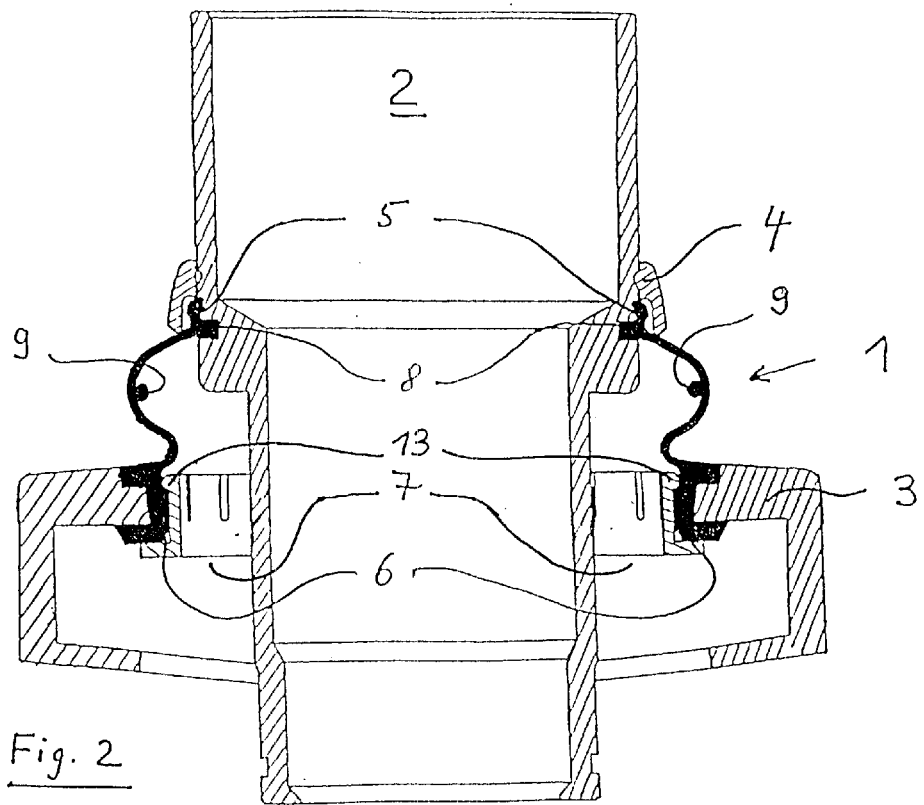
Fig. 2

EYEPIECE TUBE SLEEVE

CROSS REFERENCE TO RELATED APPLICATIONS

This application claims priority of the German patent application 100 23 569.7 filed May 15, 2000 and of German patent application 100 45 228.0 filed Sep. 13, 2000, which are incorporated by reference herein.

FIELD OF THE INVENTION

The application concerns a sleeve for movable eyepiece tubes that are provided in an optical device, in particular in a microscope equipped with a binocular tube.

BACKGROUND OF THE INVENTION

A displacement of one individual eyepiece tube that is mounted movably in a monocular tube can be ergonomically advantageous, for example, if an optimum viewing height for the particular microscope user is thereby to be established. In the case of microscopes equipped with binocular tubes, on the other hand, it is necessary to shift at least one eyepiece tube laterally in corresponding fashion for adaptation to the optimum interpupillary distance of the particular user. The shifting of an eyepiece or of both eyepieces can be accomplished along a straight line; it is also possible for the shifting to be accomplished on a circular path or along a differently curved path. In each case, a passthrough opening, dimensioned in such a way that the eyepiece can be shifted in at least one direction, must be present as part of the design in the housing part carrying the eyepiece. Design problems arise in this context, in that the internal parts of the microscope modules (eyepiece component, microscope tube, etc.) cannot readily be hermetically sealed, so that after extended use, uncontrolled contamination can occur in the internal region of the optical device.

One-piece and multi-piece linear shifter arrangements for movable eyepieces have become known from the field of microscope design, but they cannot effect exact sealing of the eyepiece housing or the tube, since surface contaminants can be increasingly "pushed into" the housing as the eyepiece positions are repeatedly displaced. A hermetic seal that is impervious to air and moisture cannot be achieved with these known features. Complete cleaning of these parts of the microscope is also not possible, since the individual shifter regions are not entirely accessible to the microscope user.

Other attempts to achieve hermetic protection for optical devices consist, for example, in pulling or slipping a so-called "drape" over the entire device (for example, a surgical microscope). This proposal cannot be applied, however, in the specific region between the eyepiece tube and tube housing.

SUMMARY OF THE INVENTION

It is therefore the object of the present invention to eliminate the disadvantages of the known approaches and to achieve hermetic protection for the internal device region between a movably mounted optical component (eyepiece or eyepiece receiving tube) and a housing component (eyepiece tube or binocular tube) that is associated therewith and is stationary in the working position. A further object of the present invention is to embody the hermetic seal in such a way that external cleaning of the optical device can easily be accomplished, and the risk of inadvertent removal or shifting of the sleeve can reliably be excluded.

According to the present invention, this object is achieved by a sleeve as defined in the appended claims in that it fits in tightly contacting fashion with its eyepiece-side part around the outer wall of the eyepiece tube, and with its housing-side part around the inner wall of the opening in the tube housing provided for the eyepiece tube. It is advantageous in this context that each of the two end regions has at least two contact surfaces that do not lie in a single plane extending perpendicular to the axis of the eyepiece tube. Advantageously, the eyepiece-side part of the sleeve is configured in cross section in the shape of a upper-case L which engages into a circumferential groove provided in the outer wall of the eyepiece tube. The angle of the part that is L-shaped in cross section can be less than 90°, so that a clearance-free and exactly sealing annular lip rests against the eyepiece tube outer wall. According to a further embodiment of the present invention, the housing-side part can have, in cross section, the shape of an angled upper-case C which rests against the associated opening in the tube housing. It is advantageous in this context if the tube housing is configured, in the contact region of the housing-side part of the sleeve, in stepped fashion in cross section. The sleeve has in its central part at least one salient protrusion zone and at least one narrower waisted zone.

The sleeve according to the present invention is embodied as a one-piece flexible bellows, and is made of an aging-resistant elastomer. According to a preferred embodiment, portions of the sleeve can be configured in such a way that they have different deformation properties. It is possible, for example, for it to be made in its respective end regions from an elastomer material of greater hardness. It is also possible for the sleeve to have a circumferential, ridge-like thickening in the inner region of its protrusion zone. This thickening forms a monolithic physical unit with the overall sleeve. According to a further embodiment of the present invention, the sleeve can have, in the working position, a retaining ring fitted around it in the outer region of its eyepiece-side part.

It is also possible for the sleeve to have, in the lower part of its end region facing toward the housing, several lobe-shaped protuberances for better mechanical engagement behind the tube housing inner wall. It is advantageous if the material of the sleeve is made of electrically conductive elastomer material, for example to allow use in an antistatic binocular microscope. Lastly, it is possible for the sleeve according to the present invention to have in the region of its protrusion zone, in the working position, an insertable resilient expander ring which maintains the dimensional stability of the protrusion zone from the inside.

BRIEF DESCRIPTION OF THE DRAWINGS

The invention will now be explained in more detail with reference to the Figures, in which, schematically in each case:

FIG. 1 shows a side view of a monocular or binocular microscope housing;

FIG. 2 shows a cross section of a movable eyepiece equipped with a sleeve according to the present invention in the working position, with the eyepiece housing indicated;

FIG. 3 shows an expander ring;

FIG. 4b shows a side view of what is depicted in FIG. 4a;

FIG. 4c shows a plan view of what is depicted in FIG. 4a;

FIG. 5b shows a section along line A—A of FIG. 5a.

DETAILED DESCRIPTION OF THE INVENTION

Figure 4A:
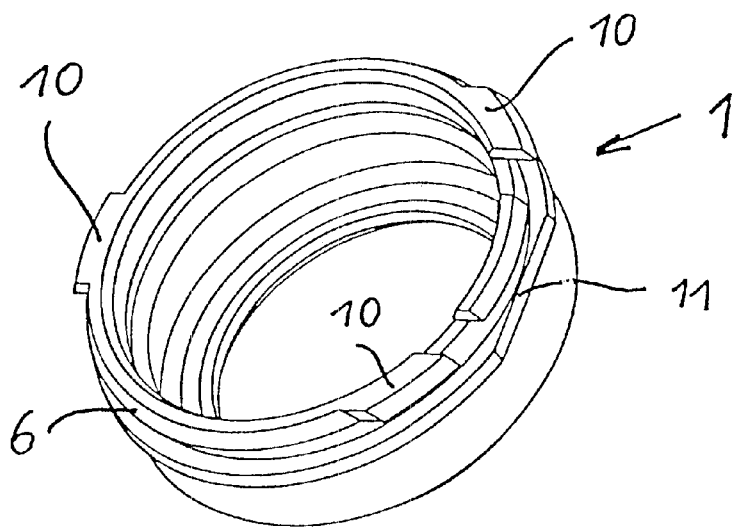
FIG. 4a shows a perspective depiction of one embodiment of the sleeve according to the present invention.

FIG. 1 depicts a side view of a monocular or binocular housing 3. Evident in the base part of this depiction is a flange for adapting this device module onto a housing of an optical device, for example a microscope. The number 2 identifies an eyepiece tube whose axis 12 is simultaneously the optical axis of the eyepiece component. This eyepiece is pivotable within the drawing plane, for example in order to establish a different viewing angle. Since FIG. 1 can also be construed as a side view of a binocular housing 3, only one of the two eyepiece tubes 2 being shown graphically, the result of a change in interpupillary distance is a translation of one or both eyepieces 2 approximately perpendicular to the drawing plane.

It is further evident that sleeve 1 covers the intermediate region between eyepiece tube 2 and tube housing 3 that is equipped with an opening 7. A salient protrusion region in the eyepiece-side part of sleeve 1 is evident, as well as a narrow waisted region in the housing-side part of sleeve 1. A retaining ring 4, which is slipped over eyepiece tube 2, additionally ensures sealing of sleeve 1 in eyepiece-side part 5.

FIG. 2 shows a cross section of a movable eyepiece tube 2 in a tube housing 3 which has a clear opening 7 that is larger than the outside diameter of eyepiece tube 2 in this region. Sleeve I exhibits in cross section, in its eyepiece-side part 5, a profile that is similar to an upper-case letter L. The resulting angle of this L-shaped profile in cross section is advantageously somewhat less than 90°; this means that the uppermost region of eyepiece-side part 5 rests with a firm press fit, in lip fashion, against the eyepiece outer wall. Although exact sealing in this part of the module is thereby already guaranteed, this can be additionally improved over the long term by a retaining ring 4. The use of this retaining ring 4 additionally yields protection against mechanical damage to the upper lip seal.

Housing-side part 6 of sleeve 1 has, in cross section, the shape of an angled upper-case letter C. It is also evident that the wall thickness of sleeve 1 in the two end regions is greater than in the region of the protrusion or waisted zones. This results in even better fitting, clamping, and contacting against the relevant housing parts. It has proven to be particularly useful that it is advantageous for the operation of a sleeve of this kind according to the present invention if it has regions with different deformation properties. For example, it could have a greater elasticity in the protrusion and waisted regions than in its regions of contact against the respective housing parts.

Figure 5A:
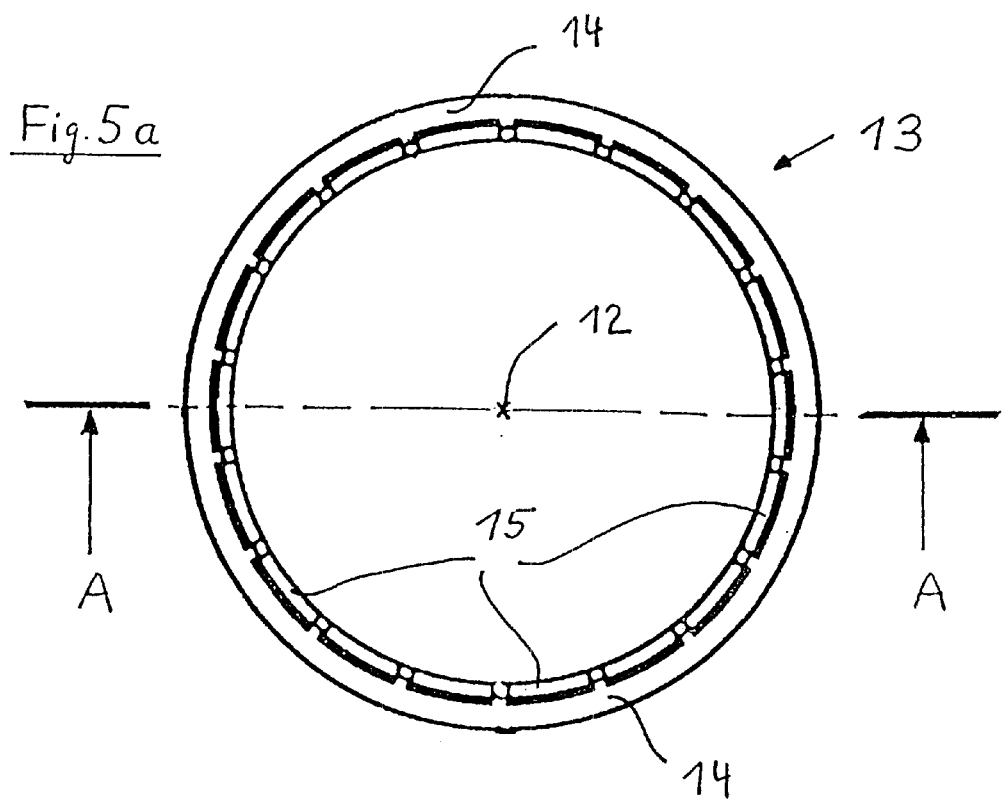
FIG. 5a shows a plan view of the clamping ring.
Figure 5B:
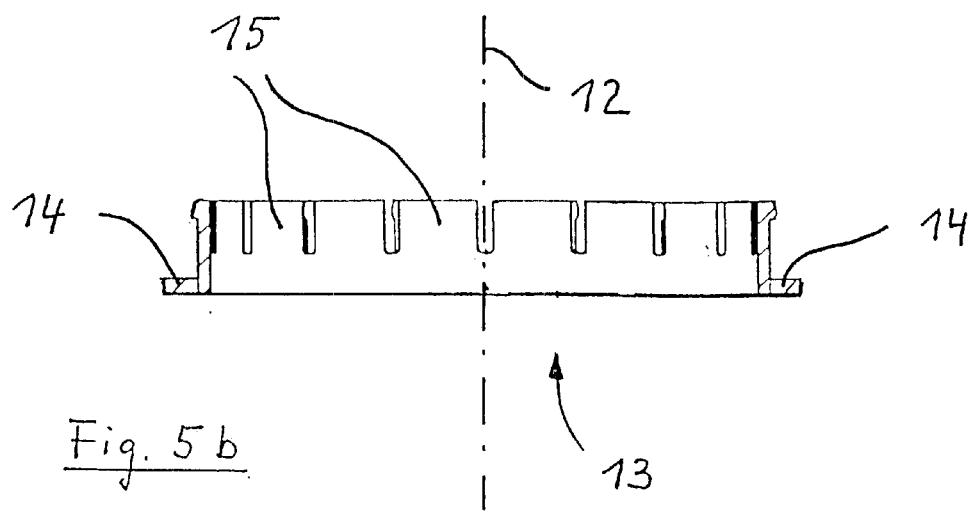

A clamping ring 13, depicted in isolation in FIGS. 5a and 5b, ensures that in the working position (see FIG. 2), housing-side part 6 of sleeve 1 is seated in immovable and accurately positioned fashion. It is evident from FIG. 5b that clamping ring 13 has an annular contact region 14 as well as a cylindrical wall region with axis 12 as the rotation axis. This wall region contains a plurality of gaps or notches, which result in a clamping ring or "snap ring" with peripherally arranged crenelation-like lamellae.

In order to guarantee an external shape for sleeve 1 that is attractive in terms of aesthetics and design in every possible adjustment position of eyepiece tube or tubes 2, and moreover to prevent the occurrence, when the outside of the housing is cleaned, of any concave indentations in the sleeve region that moreover would be even more difficult to clean from outside, sleeve 1 can have in the inner region of its protrusion region an annular, ridge-like reinforcement. This reinforcement is configured in one piece together with sleeve 1. It can be circular in cross section; other cross-sectional shapes are also possible, however, depending on the particular dimensioning of each sleeve. Alternatively, a resilient expander ring 9 depicted in FIG. 3—which is inserted as, so to speak, a supporting corset in the inner region of the protrusion zone—could also be used. This effectively prevents undesired "denting" of portions of the sleeve.

Figure 4B:
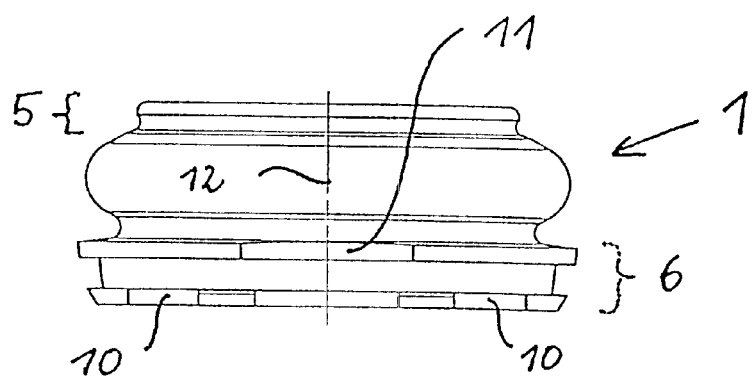
Figure 4C:
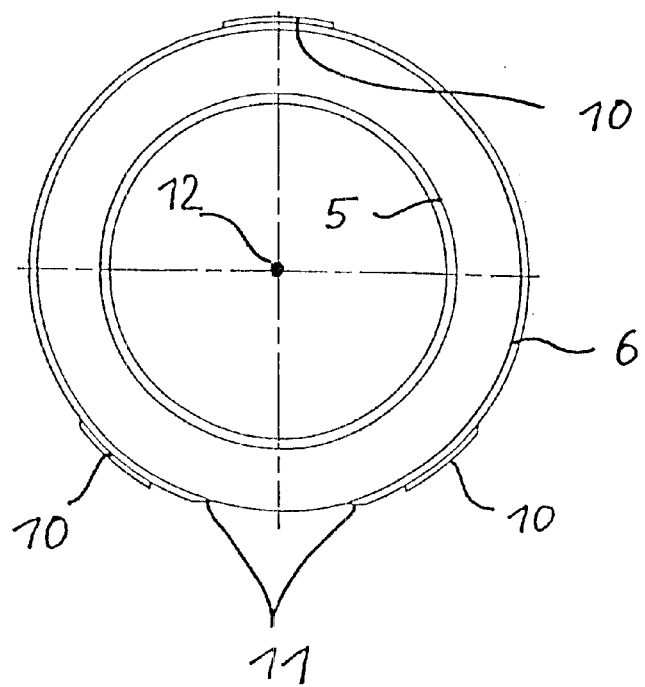

FIGS. 4a through 4c depict one particular embodiment of sleeve 1 according to the present invention. The view in FIG. 4a is toward housing-side part 6 of sleeve 1. Three lobe-shaped protuberances 10 are evident in the peripheral end region of region 6. In the working position, they engage behind the lower part of the wall of tube housing 3. Additionally evident from FIGS. 4a and 4b, and also indicated in FIG. 4c, is a peripheral flattened area 11 in the upper region of 6. This flattened area 11 is physically necessary in one specific embodiment—namely when these sleeves are used for a binocular housing—because of the small clearance between the two eyepiece tubes 2 of a binocular arrangement. If the space conditions in the binocular pivot region are more generous it is, of course, within the context of the present invention for sleeve 1 also to be configured in completely rotationally symmetrical fashion, axis 12 of sleeve 1 serving as the "rotation axis."

The particular selection of materials, the configuration, and the specific manner in which the two end regions of the sleeve make contact with the associated optical housings result in the following advantages:

- eyepiece-side flange part 5, with its L-shaped cross section, ensures a stable, nondisplaceable, hermetically locking housing join at eyepiece tube 2;
- housing-side part 6 of sleeve 1, embodied in cross section in the shape of an angled C, ensures nondisplaceable, immovably seated, hermetically sealed contact with tube housing 3;
- the middle region of sleeve 1, which is S-shaped in cross section, "regulates," so to speak, the translational and tilting motion of eyepiece tube 2 relative to tube housing 3, while simultaneously maintaining the sealing function; an attractive external design in this region of the device is retained, and the predefined protrusion and waisted zones are also maintained without annoying concave dents.

PARTS LIST

1 Sleeve
2 Eyepiece tube
3 (Binocular) eyepiece tube housing
4 (Eyepiece-side) retaining ring
5 (Upper) eyepiece-side part of (1)
6 (Lower) housing-side part of (1)
7 Opening in (3)
8 Circumferential groove on outer wall of (2)
9 Resilient expander ring
10 Lobe-shaped protuberances in lower region of (6)
11 Peripheral flattened area in upper region of (6)
12 Axis of (1) and (2)
13 (Housing-side) clamping ring
14 (Annular) contact region of (13)
15 (Crenelation-like) lamellae

What is claimed is:

1. A sleeve for movably retained eyepiece tubes for optical devices, in particular binocular microscopes, characterized in that the sleeve (1) fits with its eyepiece-side part (5) around the outer wall of an eyepiece tube (2), and with its housing-side part (6) around the inner wall of an opening (7) in a tube housing (3) provided for the eyepiece tube (2).

2. The sleeve as defined in claim 1, characterized in that each of the two end regions (5, 6) has at least two contact surfaces that do not lie in a single plane extending perpendicular to an axis (12) of the eyepiece tube (2).

3. The sleeve as defined in claim 1, characterized in that its eyepiece-side part (5) is L-shaped in cross section and engages into a groove (8) provided in the outer wall of the eyepiece tube (2).

4. The sleeve as defined in claim 3, characterized in that the angle of the part (5) that is L-shaped in cross section is less than 90 degrees.

5. The sleeve as defined in claim 1, characterized in that its housing-side part (6) has, in cross section, the shape of an angled C and rests against the opening (7) in the tube housing (3).

6. The sleeve as defined in claim 5, characterized in that the tube housing (3) is configured, in a contact region of the housing-side part (6) of the sleeve (1), in stepped fashion in cross section.

7. The sleeve as defined in claim 1, characterized in that it has in its central part at least one protrusion zone and at least one waisted zone.

8. The sleeve as defined in claim 7, characterized in that the waisted zone is arranged on the housing side.

9. The sleeve as defined in claim 1, characterized in that it is embodied as a one-piece flexible bellows, and is made of an elastomer.

10. The sleeve as defined in claim 9, characterized in that the material of the sleeve (1) has different deformation properties in different regions.

11. The sleeve as defined in claim 10, characterized in that in its respective end regions (5, 6), it is made from an elastomer material of greater hardness.

12. The sleeve as defined in claim 1, characterized in that it has a circumferential, ridge-like thickening in an inner region of a protrusion zone thereof.

13. The sleeve as defined in claim 1, characterized in that in the working position, its eyepiece-side part (5) has a retaining ring (4) fitted around it.

14. The sleeve as defined in claim 1, characterized in that in the working position, its housing-side part (6) is retained in stationary fashion by a clamping ring (13).

15. The sleeve as defined in claim 1, characterized in that in the lower part of its end region (6) facing toward the housing (3), it has several lobe-shaped protuberances (10).

16. The sleeve as defined in claim 1, characterized in that it is made of an electrically conductive plastic material.

17. The sleeve as defined in claim 1, characterized in that in the working position, it has in an inner region of a protrusion zone thereof an insertable resilient expander ring (9).

18. The use of sleeves as defined in claim 1 for eyepiece seals in antistatic optical devices, in particular binocular microscopes.

\* \* \* \* \*